April 24, 1962
C. H. HOLSCLAW
3,031,093
TRAILER BOAT GUIDE
Filed Aug. 22, 1958
3 Sheets-Sheet 2
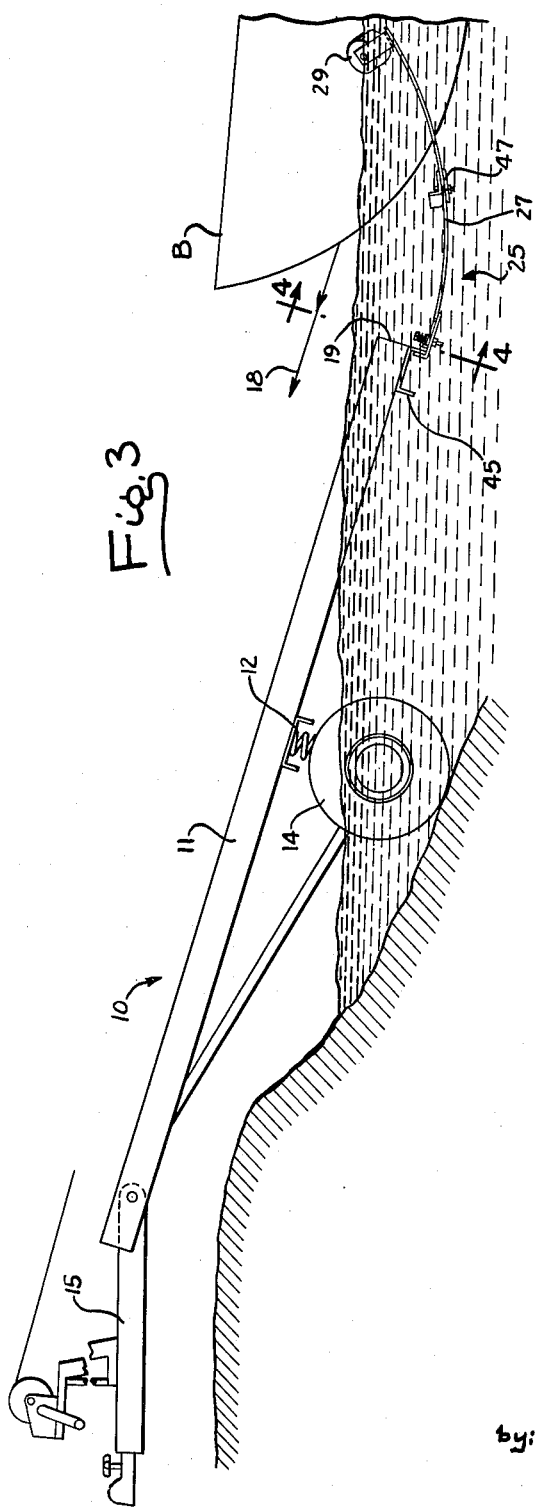
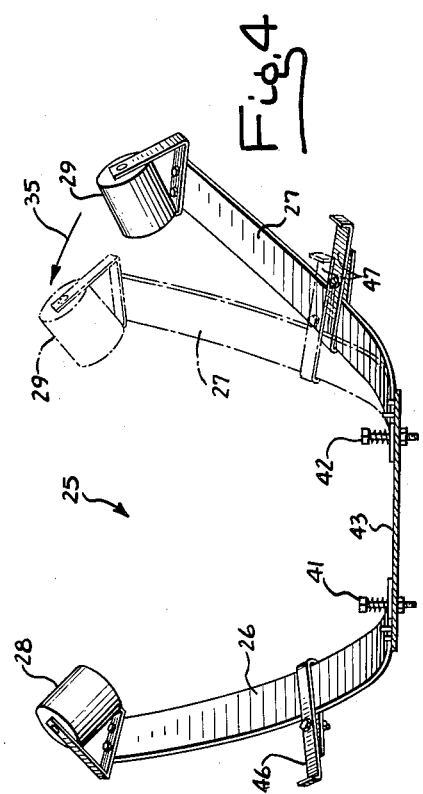
INVENTOR
CHARLES H. HOLSCLAW
by: Carlson, Pitzner, Hubbard & Wolfe
ATTYS.

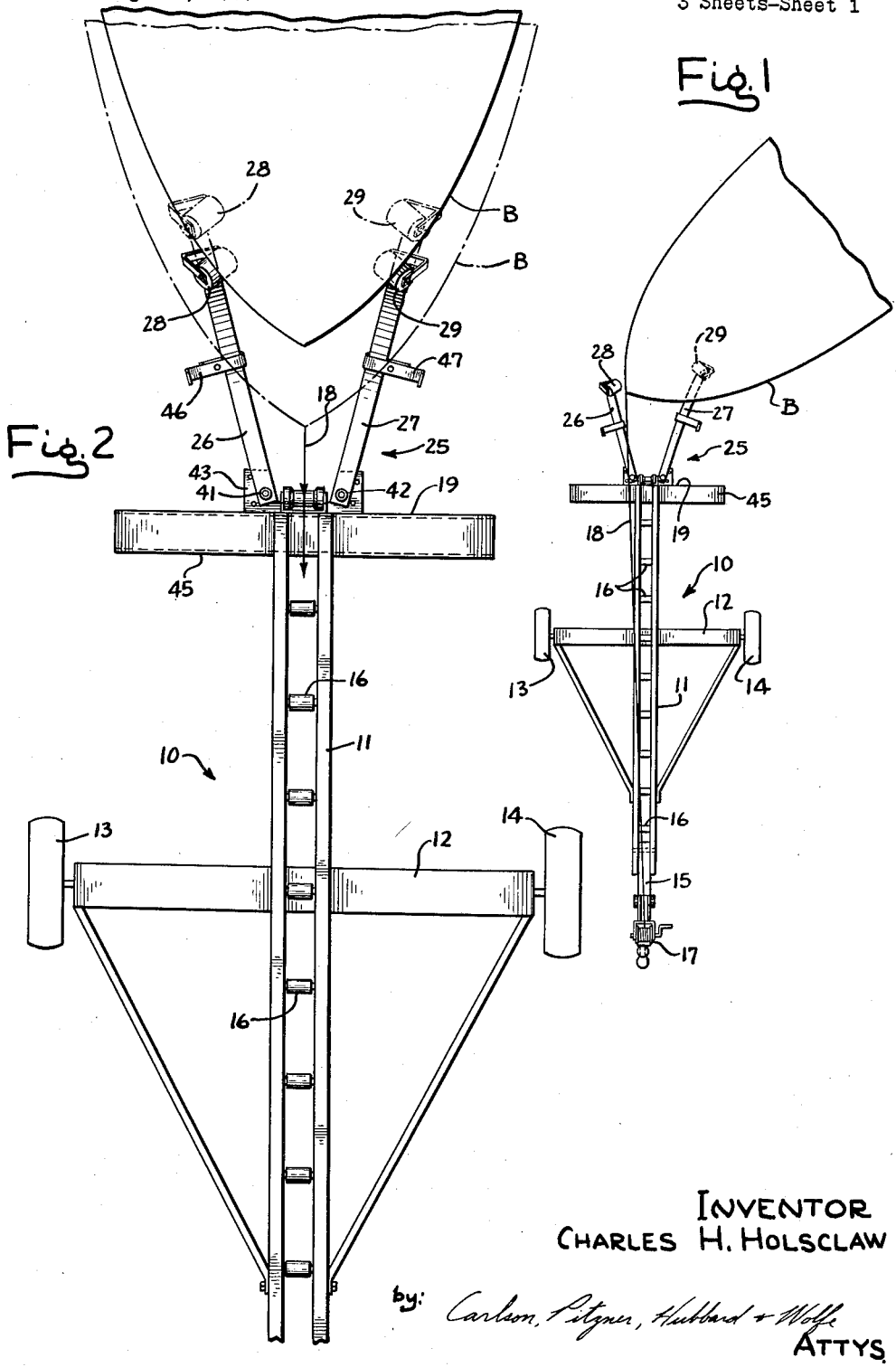

April 24, 1962 C. H. HOLSCLAW 3,031,093
TRAILER BOAT GUIDE
Filed Aug. 22, 1958 3 Sheets-Sheet 3
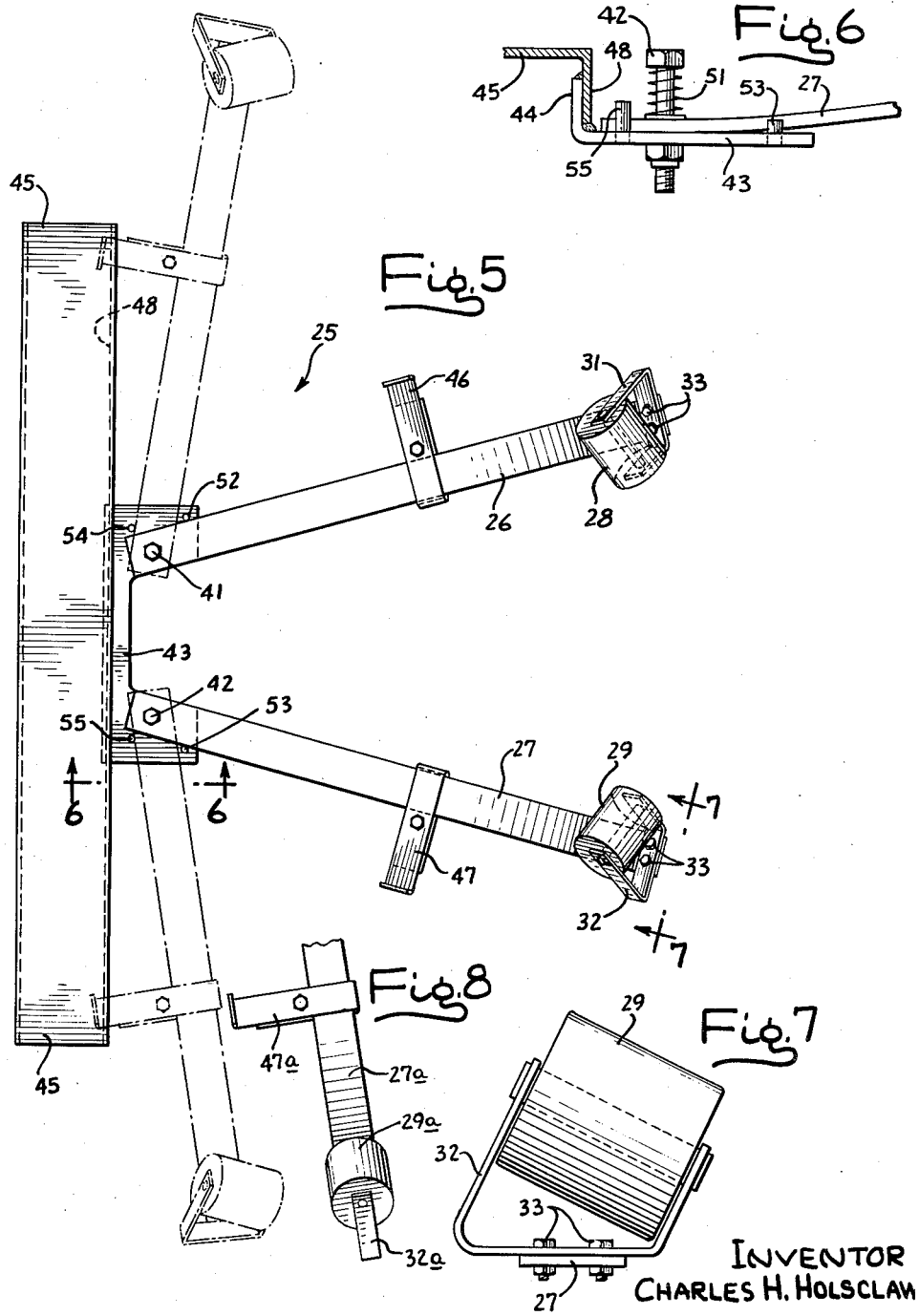
INVENTOR
CHARLES H. HOLSCLAW
by: Carlson, Pitzner, Hubbard & Wolfe
ATTYS.

United States Patent Office 3,031,093
Patented Apr. 24, 1962

3,031,093
TRAILER BOAT GUIDE
Charles H. Holsclaw, % Holsclaw Bros., Inc.,
408 N. Willow Road, Evansville, Ind.
Filed Aug. 22, 1958, Ser. No. 756,563
10 Claims. (Cl. 214—505)

The present invention relates generally to trailer-type vehicles adapted to launch, recover and transport boats, and concerns more particularly a boat guide for facilitating the loading of a boat on such a vehicle.

In the handling of relatively small boats, it is customary to carry the boats on special trailers which can be pulled behind an automobile or truck to and from convenient launching sites. To launch and recover a boat, the trailer is usually backed into the water along a gentle slope so that the boat may be smoothly transferred between the water and the trailer. Many commercial trailers include rollers on which a boat may easily roll and a winch unit whose cable or line can be secured to the boat for controlling the lowering of the boat from the trailer into the water, and for pulling the boat back onto the trailer.

However, despite the presence of friction reducing rollers and the power and efficiency of the trailer winch, successful loading still requires that the boat, while in the water, be alined with the trailer prior to being loaded. When the boat is being swung by a crosswind or current, or when choppy water causes the boat to bob, alining the boat with its trailer for loading becomes difficult. As a practical matter, it usually has been necessary for one or two persons to wade into the water to steady and aline the boat before it can be pulled onto the trailer.

Accordingly, it is the general aim of the present invention to provide a boat trailer guide for reliably and exactly alining a boat with a trailer as the boat is pulled onto the trailer, despite crosswinds, currents or choppy water.

It is a collateral object of the invention to provide a guide of the above type that facilitates loading a boat on a trailer by clearly indicating and defining a wide path through which the floating boat is guided, although the end of the trailer is under water and hidden, and by assuring proper boat alinement once it is pulled through this path.

It is another object to provide a boat guide of the above character that is also effective to dampen the bouncing movement of a boat in choppy water so as to smooth the movement of the boat from the water to its trailer, and thereby minimize the danger of possible damage to the boat hull as well as ease the loading operation.

It is a further object to form a boat guide of the above nature so that there is little likelihood of the boat scraping metal.

Moreover, it is an object to provide a boat guide as described that functions equally well within almost any trailer and with a wide variety of boats of varying shapes and sizes, so that one model of the guide can be used with virtually any trailer and boat combination of this general type.

In more detail, it is an object to provide a boat guide as characterized above that can be easily swung into an out-of-the-way transport position when not in use. It is a related object to provide a simple, easily manipulated, positive lock for reliably retaining the guide in either its transport or its operating position.

It is an additional object to provide a boat guide as set forth above that is exceptionally simple in design and quite inexpensive, having only a few easily formed parts.

Other objects and advantages of the invention will become apparent upon reading the following detailed description and upon reference to the drawings in which:

FIGURE 1 is a plan view of a boat being loaded onto a trailer which is equipped with a boat guide embodying the present invention.

FIG. 2 is an enlarged fragmentary view similar to FIG. 1 showing further stages in the loading procedure.

FIG. 3 is an elevation view of the boat, trailer, and boat guide shown in FIG. 1.

FIG. 4 is a section taken along the line 4—4 in FIG. 3.

FIG. 5 is a plan view of the boat guide embodying the present invention showing the guide both in operating and transport positions.

FIG. 6 is a fragmentary section taken along the line 6—6 of FIG. 5.

FIG. 7 is an end view of one of the boat guide arms and is taken along the line 7—7 of FIG. 5.

FIG. 8 is a fragmentary view similar to FIG. 5 showing a modification of the boat guide assembly.

While the invention will be described in connection with a preferred embodiment, it will be understood that I do not intend to limit the invention to that embodiment. On the contrary I intend to cover all alternatives, modifications and equivalents as may be included within the spirit and scope of the invention as defined by the appended claims.

Turning now to the drawings, there is shown, somewhat diagrammatically, a boat trailer 10 which includes a central, longitudinally extending frame member 11 which is crossed by an axle member 12 that supports ground engaging wheels 13 and 14. At the forward end of the trailer there is provided a tongue assembly 15 which adapts the trailer for attachment to the rear of a truck or automobile.

For supporting a boat on the trailer, the central frame member 11 includes a plurality of rollers 16 which are journaled in spaced relation along the longitudinal axis of the trailer so as to receive the boat keel and allow the boat to be easily rolled onto and off of the trailer. It will be understood, of course, that trailers of this type conventionally incorporate additional boat supports to cradle the boat on the trailer, but since such structure is not essential to a complete understanding of applicant's invention, such additional boat supporting structure has not been shown in the drawings.

In order to control the movements of a boat onto and off of the trailer, a winch assembly 17 is preferably mounted on the trailer tongue 15. The winch assembly 17 includes a winch cable or line 18 which may be secured to a boat so the winch may power the loading or unloading operation.

The normal boat loading procedure for a trailer of this type requires first that the trailer be backed into the water, as shown in FIG. 3, so that its rear or loading end 19 is well beneath the water surface. The winch line 18 is secured to the boat, indicated diagrammatically as B in the drawings, and the boat is swung into alinement with the keel rollers 16, whereupon the winch 17 may be operated to draw the boat B up onto the trailer. It will be noted that in following this normal loading procedure, it is necessary to quite accurately aline the boat with the longitudinal axis of the trailer so that the boat may move smoothly onto the rollers 16 and will not be damaged by being pulled against a metal portion of the trailer.

In accordance with the present invention, the trailer 10 is provided with a boat guide 25 at its loading end 19 which comprises a pair of arms diverging rearwardly and curved upwardly in a formation straddling the path along which the boat is loaded onto the trailer. The arms are stiffly resilient in their vertical planes and, in the illustrated embodiment, are formed of flat spring steel strips 26, 27.

Carried at the outer end of each of the arms 26, 27 are friction reducing elements which take the form of rubber rollers 28, 29, respectively. The rollers are journaled on the ends of the arms along axes which angle downwardly between the diverging arms, as may be seen particularly in FIGS. 4 and 5. In the illustrated embodiment, the rollers 28, 29 are supported by strap brackets 31, 32, respectively, which are secured by bolts 33 to the ends of the arms.

Preferably, the arms 26, 27 are curved upwardly as they diverge so that the friction reducing rollers 28, 29 are disposed well above the plane of the trailer 10, as may be seen in FIG. 3. The reason for this upward curvature may be best appreciated by briefly considering the function of the guide 25 during a boat loading operation.

In operation, the rubber rollers 28, 29 extend up out of the water when the loading end 19 of the trailer is moved into boat loading position, as shown in FIG. 3. The rollers thus clearly define a fairly wide path into which the bow of the boat B can be easily pointed. Without the boat guide 25, the rear end of the trailer, being under water, is often difficult to see, particularly when the water is somewhat choppy.

As the winch 17 is operated to pull the boat B into the path defined by the rollers, any current or crosswind will tend to swing the boat against one or the other of the rollers; in FIG. 1 the boat is shown swung to the right against the roller 29. The force of the boat swinging against the inclined roller causes the arm on which the roller is journaled to flex downwardly in the plane of its curvature. Thus, the engaged roller provides a fulcrum point about which the winch may swing the boat back into alignment. Since the arm against which the boat swings flexes primarily in a vertical plane, it will be appreciated that there will be little or no lateral "give" to the arm, and thus a firm fulcrum point is maintained.

Furthermore, when the boat swings against one of the rollers and depresses the associated arm, a resilient force is exerted against the boat that assists in swinging the latter back into proper alignment. This can be seen best in FIG. 4 where, due to the engagement of the boat B with the roller 29 as in FIG. 1, the arm 27 is flexed from the normal broken line position to the position shown in solid lines. In seeking to return to its normal position, the spring steel arm 27 exerts an upwardly inclined resilient force which is applied to the boat through the roller 29 in the direction indicated by the arrow 35. Thus, the resilient force of the arm 27 tends to move the boat into proper alignment.

As the winch draws the boat closer to the trailer, it will be appreciated that the bow of the boat will engage both the rollers 28, 29 and tend to depress each of their associated arms 26, 27. Thus, the arms move from their solid to their broken line position in FIG. 2, with the result that both of the rollers 28, 29 exert a resilient force upwardly and toward the centerline of the boat as it approaches the trailer. These resilient forces not only laterally guide the boat, but also exert a pronounced dampening effect on bobbing boat motion imparted by choppy water. In this way, when the keel of the boat first strikes the end 19 of the trailer, the up-and-down motion of the boat bow will have been virtually eliminated even in quite choppy water. This action, of course, minimizes the danger of the boat sharply striking the trailer so as to damage its hull.

It will be also understood that as the boat moves between the rollers 28, 29 and up onto the trailer, the inclined rollers and their resilient supporting arms 26, 27 will conform to the particular bottom shape of the boat being loaded, even though conventional boat bows present relatively complex curved surfaces. Thus, continuous guidance and support is given the boat throughout the loading operation.

It is an important additional feature of the invention that the arms 26, 27 are pivotally mounted to the trailer 10 so that they can be swung to a transport position when not in use and secured against bouncing or vibration as the trailer is moved. For this purpose the arms are secured by means of pivot bolts 41, 42, respectively, which pass through a mounting plate 43. In the illustrated embodiment, the mounting plate 43 has an up-turned rear portion 44, see FIG. 6, that is welded to a crossframe member 45 forming a part of the frame of the trailer 10. The arms 26, 27 therefore swing from their operating position, shown in solid lines in FIG. 5, back alongside of the crossframe member 45 to their transport position, shown in broken lines in FIG. 5.

For the purpose of holding the arms 26, 27 in their transport position without bouncing or vibration, hook forming strap members 46, 47, respectively, are secured to the arms. With the arms swung to their transport position they may be depressed until the hooks formed by the strap members 46, 47 pass beneath and behind a depending ledge 48 formed on the crossframe member 45, whereupon the resilience of the arms 26, 27 themselves will prevent the boat guide 25 from vibrating as the trailer is moved from place to place.

As another feature of the invention, a simple positive locking arrangement is provided to secure the arms 26, 27 in either their operating or transport positions. To accomplish this, the arms 26, 27 are slideably mounted on their respective pivot bolts 41, 42, and compression springs 51, see FIG. 6, are provided to normally hold the arms firmly down against the mounting plate 43. With the arms being held against the mounting plate 43, they engage front stop pins 52, 53, respectively, which are secured to the mounting plate 43 so as to prevent the arms from swinging outwardly during the boat loading operation. The arms are prevented from swinging in the opposite direction by a pair of rear locking pins 54, 55, respectively.

Since the arms are slidable on their respective pivot bolts, it can be easily seen that by lifting the arms upwardly from the mounting plate 43, they will clear their respective locking pins 52, 53 so that they may be easily pivoted to their transport positions. Once the arms are swung over their respective front locking pins and are again lowered onto the mounting plate 43, the sets of pins 52, 54 and 53, 55 lock the arms 26, 27, respectively, in their transport positions as can be seen in FIG. 5.

It can be easily appreciated that the guide 25 in its preferred form is unusually simple in construction and therefore quite economical to manufacture. It will also be understood that the guide can be mounted on virtually any trailer of this general type since it is only necessary to secure the mounting plate 43 to a trailer's loading end. Furthermore, since the resilient arms 26, 27 and their inclined rubber rollers 28, 29 easily follow widely varying boat contours, it can be seen that the guide 25 may be effectively used with virtually any boat that may be loaded on a trailer of this type.

While the boat guide 25 is primarily intended for loading keel type boats, a simple modification of the guide adapts it for effective performance with so-called keelless boats. This readily made modification is illustrated in the fragmentary FIG. 8, wherein elements similar to those already described have been given identical reference numerals with the distinguishing suffix "a" added.

To modify the boat guide 25 for loading a keelless boat onto the trailer 10, it is sufficient to bolt the roller supporting straps, such as 32a, to the ends of the resilient arms so that the rollers are disposed generally longitudinally of the arms. When this is done, the guide is employed for loading keelless boats by leaving the resilient arms locked in their "transport" positions and by unhooking the strap members, such as 47a, so that the arms are free to curve upwardly.

The keelless bottom boat loading procedure is identical to that described above. The widely spaced rollers, such as 29a, provide the same resilient guiding support for the slightly rounded hulls of a boat of this type as was described above in connection with the more common keel type boats.

I claim as my invention:

1. A boat guide for a trailer which is adapted to slideably receive a boat from the water, comprising, in combination, a pair of arms having inner and outer ends and adapted to be secured at their inner ends to the loading end of a boat trailer, said arms diverging rearwardly and curving upwardly as they diverge and being stiffly resilient only in the plane of their curvature, and a roller journaled at the outer end of each of said arms, the axes of said rollers being angled downwardly between the diverging arms.

2. A boat guide for a trailer which is adapted to slideably receive a boat from the water, comprising, in combination, a plate adapted to be secured at the loading end of a boat trailer, a pair of arms arranged generally in diverging formation and being pivoted at their closest ends to said plate for swinging movement about vertical axes, said arms being curved upwardly as they diverge and being stiffly resilient only in the plane of their curvature, and a roller journaled at the outer end of each of said arms, the axes of said rollers being angled downwardly between the diverging arms.

3. In a boat trailer having a loading end adapted to slideably receive a boat from the water, the combination comprising, a transverse frame member secured at the loading end of the trailer, a pair of resilient guide arms pivoted on said member, releasable means for locking said arms in a diverging formation extending from said loading end, a roller journaled on the outer end of each of said arms, and means for latching said arms to said frame member when said releasable means is released and the arms are swung alongside the member.

4. In a boat trailer having a loading end adapted to slideably receive a boat from the water, the combination comprising, a transverse frame member secured at the loading end of the trailer, a pair of spaced guide arms pivoted on said member, releasable means for locking said arms so that they extend rearwardly from said loading end, said arms being curved upwardly as they extend rearwardly and being stiffly resilient in the plane of their curvature, friction reducing means disposed on the outer end of each of said arms, and means for latching said arms to said frame member when said releasable means is released and the arms are swung alongside the member.

5. In a boat trailer having a loading end adapted to slideably receive a boat from the water, the combination comprising, a horizontal plate secured at the loading end of the trailer, a pair of resilient guide arms pivoted on said plate, pins disposed on said plate for blocking rotation of said arms so as to lock said arms in a diverging formation extending from said loading end, and friction reducing means disposed on the outer end of each of said arms, the pivotal connection of said arms to said plate permitting the arms to be lifted over said pins and swung transversly of the trailer.

6. In a boat trailer having a loading end adapted to slideably receive a boat from the water, the combination comprising, a transverse frame member secured at the loading end of the trailer, a pair of spaced arms pivoted on said member, releasable means for locking said arms so that they extend rearwardly from said loading end, friction reducing means disposed on the outer end of each of said arms, said arms being stiffly resilient in the planes of their curvature, and hook elements on said arms to engage said frame member when the releasable means is released and the arms are swung into transport position alongside the member.

7. In a boat trailer having a loading end adapted to slideably receive a boat moving along a loading line from the water, the combination comprising, a pair of arms secured to the loading end of the trailer and being extended rearwardly to straddle a line along which a boat moves when being loaded onto the trailer, said arms also being curved upwardly as they extend rearwardly and being stiffly resilient in the plane of their curvature, and friction reducing means disposed at the outer end of each of said arms.

8. In a boat trailer having a loading end adapted to slideably receive a boat moving along a loading line from the water, the combination comprising, a pair of arms secured to the loading end of the trailer, said arms diverging from said loading end and straddling the line along which a boat moves when being loaded onto the trailer, said arms also being curved upwardly as they diverge and being stiffly resilient only in the plane of their curvature, and a roller journaled at the outer end of each of said arms, the axes of said rollers being angled downwardly between the diverging arms.

9. In a boat trailer having a loading end adapted to slideably receive a boat moving along a loading line from the water, the combination comprising, a pair of flat spring arms secured to the loading end of the trailer, said arms diverging from said loading end and straddling the line along which a boat moves when being loaded on the trailer, said arms having their flat dimension lying generally in a horizontal plane so as to be stiffly resilient in a vertical direction, and a roller journaled at the outer end of each of said arms, the axes of said rollers being angled downwardly between the diverging arms.

10. A boat guide for a trailer which is adapted to slidably receive a boat from the water comprising, in combination, a pair of arms having inner and outer ends and adapted to be secured at their inner ends in generally side-by-side relation to the loading end of a boat trailer, said arms curving upwardly and being stiffly resilient in the plane of their curvature, and friction-reducing means at the outer end of each of said arms.

References Cited in the file of this patent

UNITED STATES PATENTS

| | | |
|---|---|---|
| 2,708,045 | Shontz | May 10, 1955 |
| 2,852,152 | Rosselle | Sept. 16, 1958 |
| 2,856,087 | Steber | Oct. 14, 1958 |